United States Patent
Kane et al.

(10) Patent No.: US 8,445,866 B2
(45) Date of Patent: May 21, 2013

(54) REFRACTIVE INDEX MATCHED PHOSPHORS AND SUBSTRATES FOR SECURITY APPLICATIONS

(75) Inventors: James Kane, Lawrenceville, NJ (US); William Ross Rapoport, Bridgewater, NJ (US); Carsten Lau, Niedersachsen (DE)

(73) Assignee: Honeywell International Inc., Morristown, NJ (US)

( * ) Notice: Subject to any disclaimer, the term of this patent is extended or adjusted under 35 U.S.C. 154(b) by 254 days.

(21) Appl. No.: 12/966,036

(22) Filed: Dec. 13, 2010

(65) Prior Publication Data

US 2011/0147614 A1 Jun. 23, 2011

Related U.S. Application Data

(60) Provisional application No. 61/287,447, filed on Dec. 17, 2009.

(51) Int. Cl.
*G01J 1/58* (2006.01)
(52) U.S. Cl.
USPC .................................. 250/458.1; 250/459.1
(58) Field of Classification Search
USPC ............ 250/338.1, 458.1, 459.1; 252/301.16, 252/301.17
See application file for complete search history.

(56) References Cited

U.S. PATENT DOCUMENTS

| | | | |
|---|---|---|---|
| 5,846,684 A * | 12/1998 | Paz-Pujalt et al. | 430/139 |
| 2002/0020830 A1 | 2/2002 | Bass et al. | |
| 2002/0124772 A1 | 9/2002 | Egger et al. | |
| 2007/0273282 A1 | 11/2007 | Radkov et al. | |
| 2008/0079910 A1 | 4/2008 | Rutherford et al. | |
| 2009/0134414 A1 | 5/2009 | Li et al. | |

FOREIGN PATENT DOCUMENTS

| | | |
|---|---|---|
| GB | 975554 | 11/1964 |
| GB | 975555 | 11/1964 |
| GB | 1096909 | 12/1967 |

OTHER PUBLICATIONS

Leilei Peng et al., "The study of preparation and luminescence of polymethyl methacrylate/rare earth composite luminescent materials," Colloid and Polymer Science, vol. 285, No. 2, Nov. 2006, pp. 153-160 (Abstract only).
Yina Huang et al., "PMMA with long-persistent phosphors and its behavior of luminescence," Journal of Rare Earths, vol. 24, No. Suppl. 2, Dec. 2006, pp. 157-159 (Abstract only).
Mick Martindill, "Now you see it, now you don't," Plastics Engineering, vol. 63, No. 1, Jan. 2007, pp. 18-23 (Abstract only).

* cited by examiner

*Primary Examiner* — Mark R Gaworecki
(74) *Attorney, Agent, or Firm* — Ingrassia Fisher & Lorenz, PC

(57) ABSTRACT

Phosphor compositions are provided that can be incorporated into or onto plastic substrates as covert security features. The plastic substrates can be transparent and the phosphor compositions have a refractive index that effectively matches the refractive index of the plastic substrate to maintain the transparency. The phosphor compositions have absorption in the infrared, thus enabling excitation and detection of the compositions with an infrared emitting source.

16 Claims, No Drawings

REFRACTIVE INDEX MATCHED PHOSPHORS AND SUBSTRATES FOR SECURITY APPLICATIONS

CROSS-REFERENCE TO RELATED APPLICATIONS

This application claims the benefit of U.S. Provisional Application Ser. No. 61/287,447, filed Dec. 17, 2009, currently pending.

FIELD OF THE INVENTION

The present technology relates to the incorporation of phosphors into plastic articles, and utilizing the incorporated phosphors as security features.

DESCRIPTION OF RELATED ART

There are many applications in which it is desirable to incorporate a security feature into a document or other article. Such security features provide ways to authenticate or validate the article and thus prevent counterfeiting. Some security features are visible to the human eye, while others are hidden or invisible and require the use of specialized detection equipment. Visible security features can include, for example, holograms, water marks, embossed images, security ribbons or foils, colored threads or fibers. Hidden or invisible security features can include, for example, fluorescent fibers, chemically sensitive stains, and fluorescent pigments or dyes that can be incorporated into the substrate of an article, the ink printed onto an article, or the resin used to make films with which the article is laminated.

Articles that include security features can be made from a variety of substrates, including polymers such as plastics. Australia, for example, has developed currency made from biaxially-oriented polypropylene, rather than paper. The polymer substrate of the currency behaves a lot like paper and conventional printing techniques are used to apply ink to the surface. One security feature that can be included in such polymeric currency is a transparent window, which can include, for example, an optically variable device that utilizes diffraction grating, which makes it more difficult to counterfeit the currency using photocopiers or scanners.

SUMMARY OF THE INVENTION

The present technology relates to phosphor based security features that can be incorporated into plastic substrates. In particular, examples disclosed herein can provide a visually clear plastic substrate including a phosphor composition that is detectable by excitation with an infrared emitting source.

In one aspect, a plastic substrate is provided that includes a transparent plastic material having a refractive index and a phosphor composition incorporated into the plastic material. The phosphor composition includes at least one active ion and a fluoride containing crystalline host lattice material. The phosphor composition has absorption in the infrared, and has a refractive index that effectively matches the refractive index of the plastic material.

In another aspect, a method of detecting a phosphor based covert security feature in a plastic substrate is provided that includes the steps of providing a plastic substrate and directing an infrared emitting source at the plastic substrate to excite the phosphor composition. The plastic substrate includes a transparent plastic material having a refractive index, and a phosphor composition having absorption in the infrared that is incorporated into the plastic. The phosphor composition includes at least one active ion and a fluoride containing crystalline host lattice material, and has a refractive index that effectively matches the refractive index of the plastic material.

DETAILED DESCRIPTION

In many applications it is desirable to incorporate phosphor based security features with plastic substrates to enable verification that articles formed from the plastic substrates are authentic. Phosphor based security features can include a phosphor composition comprising at least one active ion and a suitable host lattice material. The term active ion refers to an ion that absorbs, emits and/or transfers energy in the optical spectrum from the UV to the IR. The phosphor based security features can be incorporated into plastic substrates, and presence of the phosphor can be detected by utilization of an infrared emitting source directed at the plastic substrate that excites the phosphor composition. In some examples, excitation of the phosphor composition can be detected by the human eye, including, but not limited to, when the phosphor is an up-converter suitably excited by a laser such as a 980 nm laser pointer. In other examples, excitation of the phosphor composition can be a machine readable feature, including, but not limited to, when the phosphor composition emits very weak signals or signals that are not within the visible spectrum.

Plastic substrates generally include a plastic material and any additives desired for a given application, including, for example, the phosphor compositions described herein. Plastic substrates can be any thickness suitable for the desired application, and can be single layer or multi-layer. In instances where the plastic substrate has multiple layers, such as, for example, when the plastic substrate is a laminated multi-layer film, the phosphor composition can be incorporated into a single layer of the film. Plastic substrates can be formed into a wide variety of security articles, including but not limited to value documents such as, for example, bonds or banknotes. In some examples where a plastic substrate is used in a value document, the thickness of the plastic substrate can be, for example, from about 0.05 mm to about 2 mm.

In some applications, plastic substrates, or at least a portion thereof, can include plastic material that is transparent, or visually clear. For example, a plastic substrate can be entirely transparent, or can include a transparent section or window. When any portion of the plastic substrate is transparent, or visually clear, meaning that a person can see through the plastic substrate, and that the plastic substrate does not exhibit substantial opacity, cloudiness or light scattering, the refractive index of the phosphor compositions disclosed herein can be effectively matched to the refractive index of the transparent plastic material in the plastic substrate, so that the plastic substrate preferably maintains the same, or substantially the same, level of transparency or visual clarity. When the phosphor compositions are incorporated into one layer of a multi-layer plastic substrate, the refractive index of the phosphor composition can be effectively matched to the refractive index of the plastic material in that one layer.

Phosphor compositions of the present technology can be made by numerous methods as known to those in the art. These methods include, for example, direct synthesis, precipitation and can also include multiple step processes with post processing.

Effective matching of the refractive index of the phosphor composition and the refractive index of the plastic material can be accomplished when there is no substantial difference to the human eye between the levels of transparency in a plastic substrate containing the phosphor composition and a plastic substrate that is otherwise the same in thickness and composition, but does not contain the phosphor composition. For some applications, for example, an effective match between the refractive index of the phosphor composition and the refractive index of the plastic material can be obtained when the value of the refractive index of the phosphor composition is within about 2% of the value of the refractive index of the plastic material, meaning that the value of the refractive index of the phosphor composition is equal to the value of the refractive index of the plastic material plus or minus about 2%. For other applications, an effective match between the refractive index of the phosphor composition and the refractive index of the plastic material can be obtained when the value of the refractive index of the phosphor composition is within about 1%, within about 0.5%, within about 0.25%, within about 0.2%, or within less than about 0.2% of the value of the refractive index of the plastic material.

Effective matching of the refractive index of the phosphor composition and the refractive index of the plastic material can be dependent upon factors such as, for example, the thickness of the plastic material and the amount of the phosphor composition added to the plastic material in forming the plastic substrate. For example, the visual effect of a given difference between the refractive index of the phosphor composition and the refractive index of the plastic material may vary based upon the thickness of the plastic material. Thus, it may be acceptable for the difference between the refractive index of the phosphor composition and the refractive index of the plastic material to be higher in applications where the plastic material is thin, because the visual effect of the difference in the plastic material is not as significant. As the thickness of the plastic material increases, however, the visual effect of the difference between the refractive indices tends to increase, and it is therefore preferred that the difference between the refractive index of the phosphor composition and the refractive index of the plastic material be reduced. Similarly, it is preferred that the difference between the refractive index of the phosphor composition and the refractive index of the plastic material be reduced as the amount of phosphor composition being incorporated into the plastic material is increased.

The refractive index of a material is the ratio of the velocity of light in a vacuum to its velocity in the substance. In some examples, effective matching of the refractive index of the phosphor composition and the plastic material can be conducted in the visible part of the spectrum, between about 400 nm and about 700 nm. Generally, a mis-match in the refractive indices of the materials outside of this range, such as in the infrared, are not visible to the human eye, and thus do not impact the visual clarity of the material, though they can be measured using laboratory instrumentation such as infrared cameras. The quality of the match of the refractive indices can be a function of the desired level of clarity for an application, the amount of phosphor required for the application and the thickness of the substrate material. Comparisons to determine the level of visual clarity can be made by the human eye observing the same thickness material with and without the presence of the phosphor composition.

Any suitable plastic material can be utilized in making security features of the present technology, including, for example, transparent plastics. Transparent plastics can be visually clear, and can exhibit substantially no body color, thus having substantially no absorption in the visible spectrum. Many commercially available transparent plastics have a refractive index in the range from about 1.35 to about 1.65. For example, poly(methyl methacrylate), commonly referred to as PMMA, generally has a refractive index from about 1.485 to about 1.49. Table 1 below provides the refractive index of some additional materials as further examples.

TABLE 1

| Material | Refractive Index |
| --- | --- |
| Cellulose Acetate | 1.46-1.50 |
| Ethyl Cellulose | 1.47 |
| Acrylics | 1.49 |
| Polypropylene (Unmodified) | 1.49 |
| Polybutylene | 1.50 |
| Polyethylene (Low Density) | 1.51 |
| Nylons (PA) Type II | 1.52 |
| Polyethylene (Medium Density) | 1.52 |
| Styrene Butadiene Thermoplastic | 1.52-1.55 |
| PVC (Rigid) | 1.52-1.55 |

However, phosphor compositions that utilize phosphor host lattice materials such as oxides, garnets, oxysulfides, or sulfides, tend to have a refractive index above 1.7 or above, 1.75 or above, or even 2 or above. The difference in the refractive index of a plastic and the refractive index of a phosphor composition results in optical scattering, or light scattering, when the phosphor compositions are incorporated into the plastic. For example, the clarity of PMMA is reduced when an oxide based phosphor composition is added, and a visible difference can be detected by the human eye between PMMA by itself and PMMA containing such an oxide based phosphor composition. In the case of a substantial refractive index difference and a large amount of phosphor, the material can be virtually opaque, even with only a few percent (by weight) of phosphor. In contrast, when a phosphor composition is added to PMMA that has a refractive index of about 1.48, the amount of optical scattering can be significantly reduced and the visual clarity of the PMMA can be maintained.

Phosphor compositions disclosed herein have a refractive index of 1.7 or less, and can have a refractive index from about 1.35 to about 1.65. Accordingly, these phosphor compositions can be index matched to various plastic materials, and can be incorporated into or onto the plastic materials to produce transparent or visually clear plastic substrates. The phosphor composition can be added to the plastic material in any suitable amount, and is preferably an amount that does not unacceptably adversely affect the processability of the plastic material or the structural integrity of the finished product. In some examples, when being incorporated into a plastic material, a phosphor composition can be added to the plastic material in an amount of from about 0.1% by weight of the total composition to about 5% by weight of the total composition, where the total composition includes the plastic material, the phosphor composition, and any other additives used in forming the plastic substrate. In other instances, such as for example when the plastic material is nylon, the phosphor composition can be added in amounts up to about 30% by weight of the total composition.

It is also preferred that the phosphor compositions have substantially no body color, and thus have substantially no absorption in the visible spectrum. Phosphors in phosphor compositions that have substantially no absorption in the visible spectrum cannot be detected by excitation with radiation from a visible spectrum laser or light emitting diode (LED). However, plastic materials can be transparent in the infrared, as well as being transparent in the visible spectrum. Phosphors incorporated into plastic substrates can thus be detected if they have absorption bands or lines in the infrared by excitation of the phosphors with an infrared laser or infrared emitting LED. Emission from the phosphor can be in the visible to near infrared in an up-conversion mode, in examples where the excitation of the phosphor occurs in the IR and the emission occurs at a shorter wavelength. Generally, excitation of these types of materials occurs in the 900-1000 nm spectral range, as well as the 1500-1600 nm range, depending on the phosphor composition. The emission from the phosphor can also be from down conversion, in examples where the emitted wavelength is longer than the excitation wavelength.

Many suitable phosphor compositions are isotropic in nature, exhibiting only a single refractive index as a function of wavelength. There are also phosphors compositions of more complex crystalline structures that exhibit birefringence. In examples of birefringence, more than one refractive index value can be obtained for a single wavelength, which generally maximizes along crystallographic axes. Utilization of materials that exhibit birefringence can be more likely to cause increased amounts of optical scattering because perfect refractive index matching is no longer possible. However, if the birefringence value is low a close match may be obtainable, and may be sufficient for various security feature applications. When the phosphor compositions are birefringent, the most optimal refractive index match can be derived based upon an average of the multiple refractive indices.

Phosphor host lattice materials that are suitable in phosphor compositions of the present technology include phosphor host lattice materials that contain fluoride. Phosphor host lattice materials can also be crystalline, and preferably exhibit substantially no body color. Fluoride containing phosphor host lattice materials can have a lower refractive index than the other types of phosphor hosts discussed above. Fluoride containing phosphor host lattice materials can include, for example, fluorides or oxyfluorides. There are many fluoride containing phosphor host lattice materials that may be used to index match various plastic materials. Hydrofluoric acid is often utilized in preparing many fluoride based phosphor compositions, and significant safety issues can occur during production on a large volumes scale. In some examples, safety concerns may be reduced by utilization of sodium yttrium fluoride ($NaYF_4$) as the fluoride containing phosphor host lattice materials. Another example of a suitable fluoride containing phosphor host lattice materials is Yttrium lithium fluoride ($YLiF_4$). Table 2 below provides additional information regarding some examples of fluoride containing phosphor host lattice materials.

TABLE 2

| Material | Refractive Index (in the visible ~500 nm) |
| --- | --- |
| Yttrium Lithium fluoride ($YLiF_4$) | 1.457-1.4796 |
| Lanthanum Fluoride ($LaF_3$) | 1.601 |
| Calcium fluoride ($CaF_2$) | 1.44 |
| Barium Fluoride ($BaF_2$) | 1.48 |
| Strontium fluoride ($SrF_2$) | 1.4358 |
| Sodium Yttrium Fluoride ($NaYF_4$) | 1.48 |

Phosphor compositions of the present technology can include at least one rare earth element active ion or transition metal active ion. Rare earth element active ions or transition metal active ions for use in the phosphor containing compositions can be up-converters, or can be excitable in the longer infrared wavelengths, such as at about 900 nm to about 1000 nm, or also at about 1500 nm to about 1600 nm, depending on the active ion. Rare earth element active ion or transition metal active ion that up-convert when excited in the range of about 900 nm to about 1000 nm include, but are not limited to erbium, holmium and ytterbium. Typically, these active ions can be excited at 980 nm, such as with a readily available 980 nm diode laser, and they emit in the visible spectrum by absorption of multiple 980 nm photons to generate a higher energy visible photon. For example, if a rare earth element active ion or transition metal active ion is used that is a green up-converter, shining a 980 nm laser through a plastic film or plaque causes the active ion within the plastic material to emit in the green, tracing out the path of the laser.

Some examples of phosphor compositions of the present technology include rare earth element active ions. Such phosphor compositions can include at least a first rare earth element active ion, and may further include a second rare earth element active ion. The first rare earth element active ion may be, for example, ytterbium, erbium, holmium, thulium, praseodymium, neodymium, or mixtures thereof. Similarly, the second rare earth element active ion may be, for example, ytterbium, erbium, holmium, thulium, praseodymium, dysprosium, neodymium, or mixtures thereof.

In some instances, ytterbium (Yb) may be a suitable rare earth element active ion, and can be present in the phosphor compositions in any suitable amount, such as, for example, up to about 20 atomic percent (at. %), where the atomic percent of ytterbium is the percentage of ytterbium atoms relative to all the rare earth ions in the phosphor. In some instances, up to 98% Yb can be used in the absorbing situation. Ytterbium (Yb) is an active ion that may emit, but also efficiently transfers energy non-radiatively to a second rare earth element active ion that can emit at higher frequencies though multiphoton processes. Accordingly, in some examples, phosphor compositions include a first rare earth element active ion and a second rare earth element active ion. In one example, the first rare earth element active ion is ytterbium, and the second rare earth element active ion is erbium, holmium, thulium, praseodymium or neodymium. In examples where the phosphor compositions include ytterbium and a second rare earth element active ion, the visible emission observed upon excitation of the phosphor composition within a plastic substrate may be the emission characteristic of the second rare earth element active ion from a higher lying state. Some rare earth elements, such as erbium and holmium do exhibit absorption in the visible spectrum, though they tend to be very weak or near the infrared edge of the visible spectrum. The effect of such rare earth element active ions that exhibit absorption in the visible spectrum on the visual clarity of a phosphor composition can be controlled based upon the amount of the rare earth element active ion that is included in the phosphor composition. In some examples, phosphor compositions may include up to about 8.0 atomic percent of the second rare earth element active ion.

Example 1

Phosphor compositions containing hexagonal phase sodium yttrium fluoride as the phosphor host and having the following formulations were prepared: $Na(Y_{0.78}Yb_{0.20}Er_{0.02})F_4$, $Na(Y_{0.798}Yb_{0.20}Ho_{0.002})F_4$, $Na(Y_{0.799}Yb_{0.20}Tm_{0.001})F_4$, and $Na(Y_{0.793}Yb_{0.20}Nd_{0.007})F_4$. Each of the phosphor compositions was found to be a good refractive index match for PMMA. Since these materials are a good refractive index match to PMMA, and the plastic processing temperature is hundreds of degrees Celsius below the phosphor production temperature, incorporation of these phosphor compositions as security features into articles fabricated from PMMA, or other plastic materials having a similar refractive index, can be accomplished with very little loss of the phosphor efficiency.

Plastic plaques having clear faces were molded from the masterbatch to provide samples having various thicknesses ranging from 1 mm to 5 mm thickness in steps of 1 mm increments. The phosphor composition was incorporated into the plastic in an amount of 0.5% by weight. Plastic plaques having the same thicknesses were also molded of PMMA without the phosphor composition for comparison purposes. The plaques including the phosphor composition were very similar in appearance to the plaques that did not include the phosphor composition. Both types of plaques appeared visually to be clear, and there did not appear to be significantly more light scattering by the phosphor containing plaques. The plaques including the phosphor composition showed the path of a 980 nm laser beam through the material as a green line due to the visible emitting up-conversion process.

Further testing of the NaYF$_4$:Er:Yb phosphor composition indicated that the refractive index can be varied by changing the elemental concentrations therein, while still maintaining desirable visual clarity and infrared absorption properties of the phosphor composition. Accordingly, the refractive index of the NaYF$_4$:Er:Yb phosphor composition can be altered as desired to match the refractive index of a plastic being used for a particular application.

Example 2

Plaques that were 0.125" thick were made containing PMMA and a phosphor composition utilizing sodium yttrium fluoride as the phosphor host. The phosphor composition had the formulation: Na(Y$_{0.7993}$Yb$_{0.20}$Nd$_{0.007}$)F$_4$. The plaques exhibited no noticeable color due to the very low neodymium ion concentration as well as the colorless ytterbium content. The phosphor composition, containing 20 atomic percent (at. %) ytterbium and 0.7 atomic percent (at. %) neodymium, was a good refractive index match for PMMA, and very low optical scatter loss was observed. The phosphor composition functioned as a machine readable feature within PMMA by utilizing the energy transfer between the neodymium and ytterbium. The plaques were excited by a 760 nm infrared LED into the neodymium absorption lines around 760 nm. The detected IR emission was at 1020 nm (1.02 microns), which is the characteristic ytterbium emission in this host material. It is noted that emissions at 1020 nm are within the detection range of silicon detectors. Silicon detectors can be desirable because they tend to be extremely high quality, exhibit high sensitivity in the visible to about 1000 nm, exhibit low electronic noise and are relatively inexpensive.

Example 3

Phosphor compositions containing hexagonal phase sodium yttrium fluoride as the phosphor host and having the following formulations were prepared: Na(Y$_{0.78}$Yb$_{0.20}$Er$_{0.02}$)F$_4$, Na(Y$_{0.798}$Yb$_{0.20}$Ho$_{0.002}$)F$_4$, Na(Y$_{0.799}$Yb$_{0.20}$Tm$_{0.001}$)F$_4$, and Na(Y$_{0.793}$Yb$_{0.20}$Nd$_{0.007}$)F$_4$. Each of the phosphor compositions was found to be a good refractive index match for Polypropylene. Since these materials are a good refractive index match to Polypropylene, and the plastic processing temperature is hundreds of degrees Celsius below the phosphor production temperature, incorporation of these phosphor compositions as security features into articles fabricated from Polypropylene, or other plastic materials having a similar refractive index, can be accomplished with very little loss of the phosphor efficiency.

Plastic plaques were molded from the masterbatch that have multiple thickness and clear faces. Plastic plaques were also molded of polypropylene without the phosphor composition for comparison purposes. The plaques including the phosphor composition were very similar in appearance to the plaques that do not include the phosphor composition. Both types of plaques appear visually to be clear, and there does not appear to be significantly more light scattering by the phosphor containing plaques. The plaques including the phosphor composition show the path of a 980 nm laser beam through the material as a green line due to the visible emitting up-conversion process.

Example 4

Plaques that are 0.125 inches thick were made containing polypropylene and a phosphor composition utilizing sodium yttrium fluoride as the phosphor host. The phosphor composition had the formulation: Na(Y$_{0.7993}$Yb$_{0.20}$Nd$_{0.007}$)F$_4$. The plaques exhibited no noticeable color due to the very low neodymium ion concentration as well as the colorless ytterbium content. The phosphor composition, containing 20 atomic percent (at. %) ytterbium and 0.7 atomic percent (at. %) neodymium, was a good refractive index match for polypropylene, and very low optical scatter loss was observed. The phosphor composition functions as a machine readable feature within polypropylene by utilizing the energy transfer between the neodymium and ytterbium. The plaques were excited by a 760 nm infrared LED into the neodymium absorption lines around 760 nm. The detected IR emission was at 1020 nm (1.02 microns), which is the characteristic ytterbium emission in this host material.

Example 5

Phosphor compositions containing hexagonal phase sodium yttrium fluoride as the phosphor host and having the following formulations were prepared: Na(Y$_{0.78}$Yb$_{0.20}$Er$_{0.02}$)F$_4$, Na(Y$_{0.798}$Yb$_{0.20}$Ho$_{0.002}$)F$_4$, Na(Y$_{0.799}$Yb$_{0.20}$Tm$_{0.001}$)F$_4$, and Na(Y$_{0.793}$Yb$_{0.20}$Nd$_{0.007}$)F$_4$. Each of the phosphor compositions was found to be a good refractive index match for acrylic. Since these materials are a good refractive index match to acrylic, and the plastic processing temperature is hundreds of degrees Celsius below the phosphor production temperature, incorporation of these phosphor compositions as security features into articles fabricated from acrylic, or other plastic materials having a similar refractive index, can be accomplished with very little loss of the phosphor efficiency.

Plastic plaques were molded from the masterbatch that have multiple thickness and clear faces. Plastic plaques are also molded of the acrylic without the phosphor composition for comparison purposes. The plaques including the phosphor composition are very similar in appearance to the plaques that do not include the phosphor composition. Both types of plaques appeared visually to be clear, and there did not appear to be significantly more light scattering by the phosphor containing plaques. The plaques including the phosphor composition show the path of a 980 nm laser beam through the material as a green line due to the visible emitting up-conversion process.

Example 6

Plaques that are 0.125 inches thick were made containing an acrylic having a refractive index of about 1.49 and a phosphor composition utilizing sodium yttrium fluoride as the phosphor host. The phosphor composition had the formulation: $Na(Y_{0.7993}Yb_{0.20}Nd_{0.007})F_4$. The plaques exhibited no noticeable color due to the very low neodymium ion concentration as well as the colorless ytterbium content. The phosphor composition, containing 20 atomic percent (at. %) ytterbium and 0.7 atomic percent (at. %) neodymium, was a good refractive index match for the acrylic, and very low optical scatter loss was observed. The phosphor composition functions as a machine readable feature within acrylic by utilizing the energy transfer between the neodymium and ytterbium. The plaques were excited by a 760 nm infrared LED into the neodymium absorption lines around 760 nm. The detected IR emission was at 1020 nm (1.02 microns), which is the characteristic ytterbium emission in this host material.

Example 7

Phosphor compositions containing hexagonal phase sodium yttrium fluoride as the phosphor host and having the following formulations were prepared: $Na(Y_{0.78}Yb_{0.20}Er_{0.02})F_4$, $Na(Y_{0.798}Yb_{0.20}Ho_{0.002})F_4$, $Na(Y_{0.799}Yb_{0.20}Tm_{0.01})F_4$, and $Na(Y_{0.793}Yb_{0.20}Nd_{0.007})F_4$. Each of the phosphor composition was a good refractive index match for an acrylic having a refractive index of about 1.49. Since these materials are a good refractive index match to the acrylic, and the plastic processing temperature is hundreds of degrees Celsius below the phosphor production temperature, incorporation of these phosphor compositions as security features into articles fabricated from the acrylic, or other plastic materials having a similar refractive index, can be accomplished with very little loss of the phosphor efficiency.

Example 8

Phosphor compositions containing hexagonal phase sodium yttrium fluoride as the phosphor host and having the following formulations were prepared: $Na(Y_{0.78}Yb_{0.20}Er_{0.02})F_4$, $Na(Y_{0.798}Yb_{0.20}Ho_{0.002})F_4$, $Na(Y_{0.799}Yb_{0.20}Tm_{0.01})F_4$, and $Na(Y_{0.793}Yb_{0.20}Nd_{0.007})F_4$. Each of the phosphor compositions was found to be a good refractive index match for low density polyethylene. Since these materials are a good refractive index match to low density polyethylene, and the plastic processing temperature is hundreds of degrees Celsius below the phosphor production temperature, incorporation of these phosphor compositions as security features into articles fabricated from low density polyethylene, or other plastic materials having a similar refractive index, can be accomplished with very little loss of the phosphor efficiency.

Plastic plaques were molded from the masterbatch that have multiple thicknesses. It is noted that low density polyethylene tends to be a hazy or cloudy material, and thus it is preferable that low density polyethylene be used in applications such as, for example, thin films, including as a layer in a laminated film having a thicknesses of up to about 1 mil. Plastic plaques were also molded of the low density polyethylene without the phosphor composition for comparison purposes. The plaques including the phosphor composition were very similar in appearance to the plaques that did not include the phosphor composition. There did not visually appear to be significantly more light scattering by the phosphor containing plaques. The plaques including the phosphor composition show the path of a 980 nm laser beam through the material as a green line due to the visible emitting up-conversion process.

Example 9

Plaques were made containing a low density polyethylene having a refractive index of about 1.51 and a phosphor composition utilizing sodium yttrium fluoride as the phosphor host. The phosphor composition had the formulation: $Na(Y_{0.7993}Yb_{0.20}Nd_{0.007})F_4$. The plaques exhibited no noticeable color due to the very low neodymium ion concentration as well as the colorless ytterbium content. The phosphor composition, containing 20 atomic percent (at. %) ytterbium and 0.7 atomic percent (at. %) neodymium, was a good refractive index match for the low density polyethylene. The phosphor composition functions as a machine readable feature within low density polyethylene by utilizing the energy transfer between the neodymium and ytterbium. The plaques were excited by a 760 nm infrared LED into the neodymium absorption lines around 760 nm. The detected IR emission was at 1020 nm (1.02 microns), which is the characteristic ytterbium emission in this host material.

Example 10

Phosphor compositions containing hexagonal phase sodium yttrium fluoride as the phosphor host and having the following formulations were prepared: $Na(Y_{0.78}Yb_{0.20}Er_{0.02})F_4$, $Na(Y_{0.798}Yb_{0.20}Ho_{0.002})F_4$, $Na(Y_{0.799}Yb_{0.20}Tm_{0.01})F_4$, and $Na(Y_{0.793}Yb_{0.20}Nd_{0.007})F_4$. Each of the phosphor composition was a good refractive index match for a low density polyethylene having a refractive index of about 151. Since these materials were a good refractive index match to the low density polyethylene, and the plastic processing temperature is hundreds of degrees Celsius below the phosphor production temperature, incorporation of these phosphor compositions as security features into articles fabricated from low density polyethylene, or other plastic materials having a similar refractive index, can be accomplished with very little loss of the phosphor efficiency.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A security article formed from a plastic substrate, wherein the plastic substrate comprises:
   a transparent plastic material having a refractive index; and
   a phosphor composition incorporated into the plastic material, the phosphor composition comprising at least one active ion and a fluoride containing crystalline host lattice material;
   wherein the phosphor composition has absorption in the infrared, and has a refractive index that effectively matches the refractive index of the plastic material.

2. The security article of claim 1, wherein the phosphor composition is an up-converter.

3. The security article of claim 1, wherein the at least one active ion is selected from the group consisting of rare earth element active ions and transition metal element active ions.

4. The security article of claim 3, wherein the at least one active ion comprises a first rare earth element active ion.

5. The security article of claim 4, wherein the first rare earth element active ion is selected from the group consisting of ytterbium, erbium, holmium, thulium, praseodymium, dysprosium, neodymium, and mixtures thereof.

6. The security article of claim 1, wherein the fluoride containing crystalline host lattice material comprises sodium yttrium fluoride or Yttrium lithium fluoride.

7. The security article of claim 1, wherein the at least one rare earth element active ion or transition metal active ion comprises a first rare earth element active ion and a second rare earth element active ion.

8. The security article of claim 7, wherein the second rare earth element active ion is selected from the group consisting of ytterbium, erbium, holmium, thulium, praseodymium, dysprosium, neodymium, and mixtures thereof.

9. The security article of claim 7, wherein the first rare earth element active ion is ytterbium and the second rare earth element active ion is selected from the group consisting of erbium, holmium, thulium, praseodymium, dysprosium, neodymium, and mixtures thereof.

10. The security article of claim 7, wherein the fluoride containing crystalline host lattice material is sodium yttrium fluoride, the first rare earth active ion is ytterbium, and the second rare earth element active ion is selected from the group consisting of erbium, holmium, thulium, praseodymium, dysprosium, neodymium, and mixtures thereof.

11. The security article of claim 7, wherein the fluoride containing crystalline host lattice material is Yttrium lithium fluoride, the first rare earth active ion is ytterbium, and the second rare earth element active ion is selected from the group consisting of erbium, holmium, thulium, praseodymium, dysprosium, neodymium, and mixtures thereof.

12. The security article of claim 1, wherein the refractive index of the plastic material has a value between about 1.35 to 1.65 and the refractive index of the phosphor composition is within about 2% of the value of the refractive index of the plastic material.

13. The security article of claim 1, wherein the security article is a banknote.

14. A method of detecting a phosphor based covert security feature in a plastic substrate, the method comprising the steps of:
   providing a plastic substrate including a transparent plastic material having a refractive index, and a phosphor composition having absorption in the infrared that is incorporated into the plastic; and
   directing an infrared emitting source at the plastic substrate to excite the phosphor composition;
   wherein the phosphor composition comprises at least one active ion and a fluoride containing crystalline host lattice material, and has a refractive index that effectively matches the refractive index of the plastic material.

15. The method of claim 14, wherein the at least one active ion comprises a first rare earth element active ion.

16. The method of claim 15, wherein the at least one active ion comprises a first rare earth element active ion and a second rare earth element active ion.

* * * * *